(12) United States Patent
Lan et al.

(10) Patent No.: US 12,167,327 B2
(45) Date of Patent: Dec. 10, 2024

(54) ALLOCATION OF MOBILE DEVICES TO FREQUENCY BANDS OF A RADIO SITE

(71) Applicant: Telefonaktiebolaget LM Ericsson (publ), Stockholm (SE)

(72) Inventors: Xiaoyu Lan, Täby (SE); Lackis Eleftheriadis, Valbo (SE); Aneta Vulgarakis Feljan, Stockholm (SE); Marin Orlic, Bromma (SE); Yang Zuo, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 398 days.

(21) Appl. No.: 17/773,966

(22) PCT Filed: Nov. 6, 2019

(86) PCT No.: PCT/SE2019/051112
§ 371 (c)(1),
(2) Date: May 3, 2022

(87) PCT Pub. No.: WO2021/091438
PCT Pub. Date: May 14, 2021

(65) Prior Publication Data
US 2022/0386234 A1 Dec. 1, 2022

(51) Int. Cl.
*H04B 17/318* (2015.01)
*H04W 52/02* (2009.01)
(Continued)

(52) U.S. Cl.
CPC ...... *H04W 52/0206* (2013.01); *H04B 17/318* (2015.01); *H04W 72/0453* (2013.01); *H04W 72/52* (2023.01)

(58) Field of Classification Search
CPC ......... H04W 52/0206; H04W 72/0453; H04W 72/0486; H04W 72/04; H04W 72/12; H04B 17/318
See application file for complete search history.

(56) References Cited

U.S. PATENT DOCUMENTS 6,131,035 A * 10/2000 Ohkubo ............... H04B 1/7143
455/423
8,483,134 B2 * 7/2013 Iwai ...................... H04L 1/0029
370/328
(Continued)

FOREIGN PATENT DOCUMENTS

EP 2898716 B1 8/2016
EP 2676475 B1 * 4/2022 ........... H04B 17/345
(Continued)

OTHER PUBLICATIONS

Bogucka, Hanna, et al., "Multi-Layer Approach to Future Green Mobile Communications", IEEE Intelligent Transportation Systems Magazine, Winter 2013, 28-37.
(Continued)

*Primary Examiner* — Hai V Nguyen
(74) *Attorney, Agent, or Firm* — Murphy, Bilak & Homiller, PLLC (57) ABSTRACT

The present disclosure relates to a method of controlling allocation of mobile devices (12-23) to frequency bands in a radio site (10), and a device (11) performing the method. In an aspect, a method of a radio base station (11) of controlling allocation of mobile devices (12-23) to frequency bands in a radio site (10) is provided. The method comprises estimating (S101) power consumption of the radio base station (11) caused by radio traffic of the mobile devices (12-23) in each frequency band of the radio site (10), determining (S102) whether or not power consumption of the radio base station (11) is decreased by reallocating at
(Continued)

least one of the mobile devices (12-23) from one frequency band to another frequency band, while not exceeding a power headroom limit of said another frequency band, and if so reallocating (S103) said at least one mobile device from said one frequency band to said another frequency band.

16 Claims, 4 Drawing Sheets

(51) Int. Cl.
  *H04W 72/0453* (2023.01)
  *H04W 72/52* (2023.01)

(56) References Cited

U.S. PATENT DOCUMENTS

| | | | | |
|---|---|---|---|---|
| 8,958,840 | B2* | 2/2015 | Kim | H04W 72/21 455/67.11 |
| 9,148,789 | B2* | 9/2015 | Hulkkonen | H04W 52/243 |
| 9,485,723 | B2* | 11/2016 | Chakraborty | H04W 24/02 |
| 9,608,696 | B2* | 3/2017 | Afkhami | H04L 27/2646 |
| 10,051,649 | B2* | 8/2018 | Li | H04W 72/02 |
| 10,383,067 | B2* | 8/2019 | Lin | H04W 52/367 |
| 10,397,831 | B1 | 8/2019 | Kim et al. | |
| 10,397,886 | B2* | 8/2019 | Akula | H04L 5/0098 |
| 10,728,859 | B2* | 7/2020 | Kim | H04W 52/365 |
| 10,757,655 | B1* | 8/2020 | Vivanco | H04W 52/08 |
| 10,904,857 | B2* | 1/2021 | Jung | H04W 76/28 |
| 11,012,945 | B2* | 5/2021 | Hasholzner | G06F 1/26 |
| 11,622,355 | B2* | 4/2023 | Alizadeh | H04W 52/283 455/522 |
| 11,778,536 | B2* | 10/2023 | Kim | H04W 4/70 370/329 |
| 11,809,256 | B2* | 11/2023 | Ismail | G06F 1/206 |
| 11,909,594 | B2* | 2/2024 | Rahman | G06F 16/2379 |
| 11,985,607 | B2* | 5/2024 | Chincholi | H04W 52/262 |
| 12,021,772 | B2* | 6/2024 | Shin | H04W 72/0446 |
| 2004/0214579 | A1* | 10/2004 | Mattila | H04W 16/32 455/449 |
| 2010/0248736 | A1* | 9/2010 | Hulkkonen | H04W 52/243 455/452.2 |
| 2010/0296470 | A1* | 11/2010 | Heo | H04W 72/20 370/329 |
| 2012/0093114 | A1* | 4/2012 | Goto | H04B 7/061 370/329 |
| 2012/0243431 | A1* | 9/2012 | Chen | H04W 52/383 370/252 |
| 2012/0287978 | A1* | 11/2012 | O'Keeffe | H01Q 21/245 375/295 |
| 2013/0057711 | A1* | 3/2013 | Jung | H04N 19/61 348/207.1 |
| 2015/0038158 | A1* | 2/2015 | Kim | H04W 72/21 455/561 |
| 2015/0103751 | A1* | 4/2015 | Afkhami | H04L 25/03834 370/329 |
| 2015/0103809 | A1* | 4/2015 | Karimi | H04L 5/0046 370/336 |
| 2015/0140955 | A1* | 5/2015 | Chakraborty | H04W 52/0203 455/574 |
| 2016/0323893 | A1* | 11/2016 | Feng | H04L 5/0073 |
| 2017/0150504 | A1 | 5/2017 | Soldati et al. | |
| 2017/0264466 | A1* | 9/2017 | Hosseini | H04L 25/021 |
| 2017/0353932 | A1* | 12/2017 | Sorrentino | H04W 52/383 |
| 2018/0013500 | A1* | 1/2018 | Liao | H04J 11/0023 |
| 2018/0310254 | A1* | 10/2018 | Jeong | H04W 52/367 |
| 2018/0310257 | A1* | 10/2018 | Papasakellariou | H04W 72/23 |
| 2019/0029019 | A1* | 1/2019 | Zhang | H04L 5/0042 |
| 2019/0104480 | A1* | 4/2019 | Hasholzner | G06F 1/324 |
| 2019/0306828 | A1* | 10/2019 | Kim | H04W 72/0446 |
| 2019/0312669 | A1* | 10/2019 | Kwak | H04L 1/0026 |
| 2020/0229104 | A1* | 7/2020 | MolavianJazi | H04W 52/146 |
| 2020/0267667 | A1* | 8/2020 | MolavianJazi | H04W 52/365 |
| 2020/0374804 | A1* | 11/2020 | Mukkavilli | H04L 5/0044 |
| 2020/0383059 | A1* | 12/2020 | Vivanco | H04W 52/386 |
| 2021/0144673 | A1* | 5/2021 | Jung | H04W 68/02 |
| 2021/0159990 | A1* | 5/2021 | Meylan | G08B 7/06 |
| 2021/0234784 | A1* | 7/2021 | Zeng | H04L 43/0894 |
| 2021/0352567 | A1* | 11/2021 | Kim | H04W 48/02 |
| 2021/0368401 | A1* | 11/2021 | Yang | H04L 5/0098 |
| 2022/0030525 | A1* | 1/2022 | Chincholi | H04B 17/14 |
| 2022/0123885 | A1* | 4/2022 | Shin | H04W 74/0833 |
| 2022/0224466 | A1* | 7/2022 | Ji | H04L 5/0035 |
| 2022/0322247 | A1* | 10/2022 | Sun | H04W 52/42 |
| 2023/0006712 | A1* | 1/2023 | Mamola | H04R 25/554 |
| 2023/0105521 | A1* | 4/2023 | Baek | H04L 5/1469 370/280 |
| 2023/0309071 | A1* | 9/2023 | Jia | H04W 24/08 |
| 2023/0319735 | A1* | 10/2023 | Takeda | H04W 52/146 370/318 |
| 2024/0056984 | A1* | 2/2024 | Novlan | H04W 28/0263 |

FOREIGN PATENT DOCUMENTS

| | | | | |
|---|---|---|---|---|
| JP | | 4632245 B2 | 2/2011 | |
| WO | | 2004057899 A1 | 7/2004 | |
| WO | | 2018102127 A1 | 6/2018 | |
| WO | WO-2019067136 A1 | * | 4/2019 | ............ H04W 52/06 |

OTHER PUBLICATIONS

Holland, Oliver, et al., "Intra-Operator Dynamic Spectrum Management for Energy Efficiency", IEEE Communications Magazine, Sep. 2012, 178-184.
Holland, Oliver, et al., "Opportunistic Load and Spectrum Management for Mobile Communications Energy Efficiency", 2011 IEEE 22ndInternational Symposium on Personal, Indoor and Mobile Radio Communications, Jan. 5, 2011.

* cited by examiner

ALLOCATION OF MOBILE DEVICES TO FREQUENCY BANDS OF A RADIO SITE

TECHNICAL FIELD

The present disclosure relates to a method of controlling allocation of mobile devices to frequency bands in a radio site, and a device performing the method.

BACKGROUND

New 5G ("5$^{th}$ generation") radio scenarios utilizing multi-standard and multi-band communication are being installed as customers require high capacity and low latency performance. Many radio network operators meet these requirements by implementing multi-carrier configurations on their radio sites. Typical future configurations will have multiple frequency bands/radio site.

Today, the increased traffic demand at densified areas such as city centres is met by adding frequency bands to available radio sites to increase the capacity. The advantage of having multiple carriers, and higher frequencies, is that a higher number of users and increased bandwidth is attained.

A problem is however that additional and higher frequency bands will lead to greater power consumption of base station(s) providing the increased capacity at the radio site, not only in terms of absolute power, but also per served mobile device of the radio site.

SUMMARY

An objective is to solve, or at least mitigate, this problem in the art and to provide an improved method of controlling allocation of mobile devices to frequency bands in a radio site, This objective is attained in a first aspect by a method of a radio base station of controlling allocation of mobile devices to frequency bands in a radio site. The method comprises estimating power consumption of the radio base station caused by radio traffic of the mobile devices in each frequency band of the radio site, determining whether or not power consumption of the radio base station is decreased by reallocating at least one of the mobile devices from one frequency band to another frequency band, while not exceeding a power headroom limit of said another frequency band, and if so reallocating said at least one mobile device from said one frequency band to said another frequency band.

This objective is attained in a second aspect by a radio base station configured to control allocation of mobile devices to frequency bands in a radio site. The radio base station comprises a processing unit and a memory, said memory containing instructions executable by said processing unit, whereby the radio base station is operative to estimate power consumption of the radio base station caused by radio traffic of the mobile devices in each frequency band of the radio site, determine whether or not power consumption of the radio base station is decreased by reallocating at least one of the mobile devices from one frequency band to another frequency band, while not exceeding a power headroom limit of said another frequency band, and if so to reallocate said at least one mobile device from said one frequency band to said another frequency band.

Hence, in a first step, a radio base station (RBS) estimates power consumption caused by radio traffic of mobile devices such as smart phones in each frequency band of a radio site hosted by the RBS. This may be performed by analysing historical power consumption data of the radio site 10, preferably by using machine learning (ML) at the RBS. Thus, the RBS may analyse weeks, months or even years of historical power consumption data for the radio site in order to estimate total power consumption caused by mobile device radio traffic in the frequency bands of the radio site during for instance the next coming hour. Thus, an ML component of the RBS may make use of historical data patterns to determine future radio site power consumption.

After the power consumption caused by the mobile devices in each frequency band of the radio site has been estimated, the RBS determines whether or not total power consumption of the radio site can be decreased by reallocating one or more of the mobile devices from one frequency band to another while not exceeding a power headroom limit of the band to which the mobile device(s) is reallocated.

If so, reallocation of one or more mobile devices from one band to another is performed.

Advantageously, since for instance a plurality of mobile devices are reallocated from higher-frequency to lower-frequency bands, the total power consumption of the radio site will decrease as radio traffic communicated at higher frequencies generally consumes more RBS power for the same traffic load as compared to being communicated at a lower frequency.

Further advantageous is that if reallocation occurs such that no mobile device is allocated to a certain band, then the carrier signal forming said certain band may be turned off. This will in itself further decrease the power consumption of the RBS, since any power amplifier in operation (i.e. transmitting a carrier signal) will consume power even if no mobile devices are allocated to the served frequency band.

In an embodiment, the RBS estimates amount of radio traffic of the mobile devices in each frequency band of the radio site, and determines whether or not amount of radio traffic of said at least one of the mobile devices to be reallocated from said one frequency band to said another frequency band would result in a radio traffic capacity of said another band being exceeded, as stipulated for instance by a predetermined radio traffic capacity threshold value, wherein the step of reallocating only is performed if radio traffic capacity of said another band is not being exceeded. Advantageously, the amount of radio traffic of the mobile devices in each frequency band of the radio site is taken into account upon reallocating any mobile device in order to avoid radio traffic capacity of a band being exceeded.

In an embodiment, the RBS estimates, when estimating the power consumption of the radio base station caused by radio traffic of the mobile devices in each frequency band of the radio site, Reference Signal Received Power (RSRP) of the mobile devices in each frequency band of the radio site, and estimates amount of radio traffic of the mobile devices in each frequency band of the radio site, wherein the determining whether or not power consumption of the radio base station is decreased by reallocating at least one of the mobile devices comprises computing a sum of a ratio between the estimated amount of radio traffic and the estimated RSRP over all frequency bands of the radio site, the computed sum being set to equal a sum of a ratio between the amount of radio traffic and the RSRP over all frequency bands of the radio site after a hypothetical reallocation being performed with the same assumed amount of radio traffic, wherein the power consumption of the radio base station is decreased if the RSRP for a particular frequency band after said hypothetical reallocation being performed is higher than the estimated RSRP for the particular frequency band. Advantageously, not only power consumption is taken into account, but also power efficiency.

In an embodiment, said at least one of the mobile devices is reallocated from a frequency band for which the RSRP after said hypothetical reallocation being performed is lower than the estimated RSRP for the frequency band.

In an embodiment, the power headroom limit is set to a threshold power value below a maximum power level of said another frequency band.

In a third aspect, a computer program is provided comprising computer-executable instructions for causing a device to perform steps of the method of the first aspect when the computer-executable instructions are executed on a processing unit included in the device.

In a fourth aspect, a computer program product is provided comprising a computer readable medium, the computer readable medium having the computer program of the third aspect embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
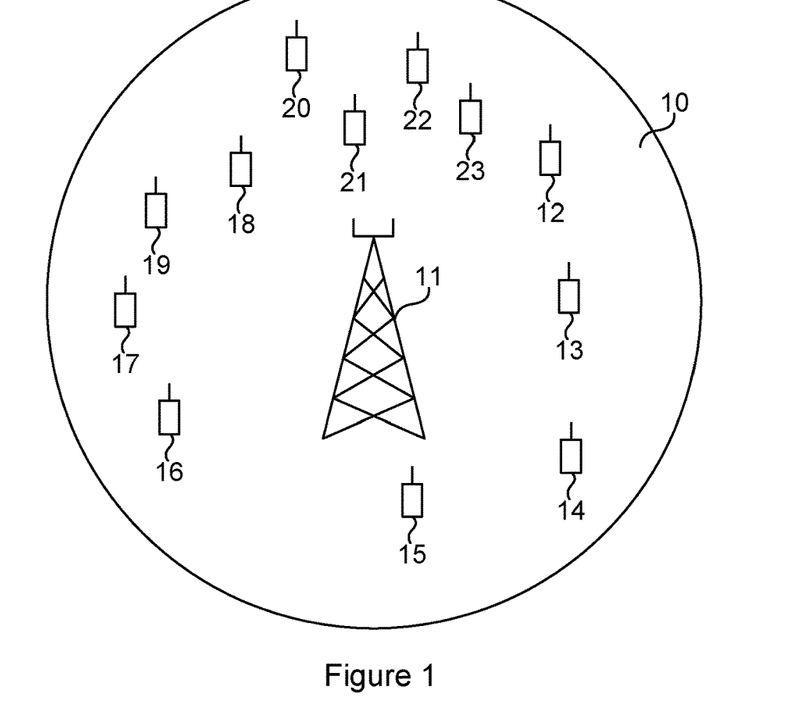
FIG. 1 shows a radio site in which embodiments may be implemented.

FIG. 1 illustrates a radio site 10 in which embodiments may be implemented. The radio site 10 comprises a radio base station (RBS) 11 serving a plurality of mobile devices 12-23 embodied in the form of for instance smart phones, tablets, laptops, etc., served by the RBS 11. These mobile devices will be referred to as User Equipment (UE). In practice, an RBS may serve hundreds of mobile devices in a radio site.

Figure 2:
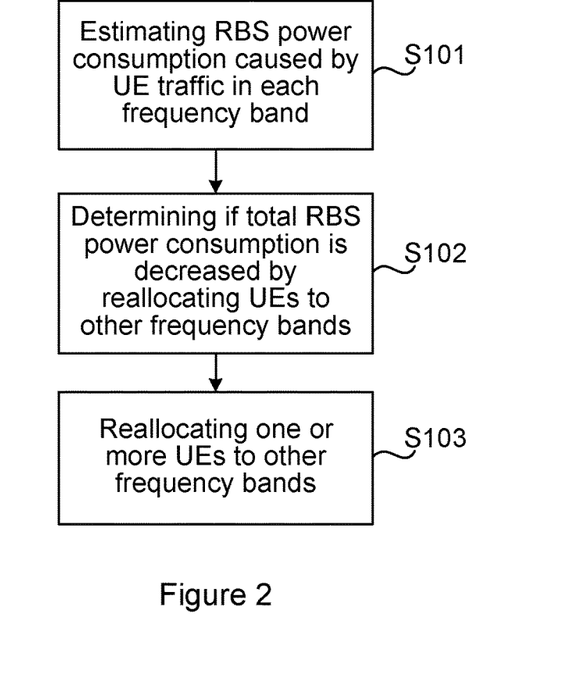
FIG. 2 shows a flowchart illustrating a method of controlling allocation of mobile devices to frequency bands in a radio site according to an embodiment.

FIG. 2 shows a flowchart illustrating a method of controlling allocation of mobile devices to frequency bands in a radio site according to an embodiment. In this particular example, the RBS 11 is assumed to utilize four frequency bands, i.e. four carrier signals, to serve the twelve UEs 12-23.

In a first step S101, the RBS 11 estimates power consumption caused by radio traffic of the UEs 12-23 in each frequency band of the radio site 10. This is performed by analysing historical power consumption data of the radio site 10, preferably by using machine learning (ML) at the RBS 11. In this respect, the RBS 11 may analyse weeks, months or even years of historical power consumption data for the radio site 10 in order to estimate total power consumption caused by UE radio traffic in the frequency bands of the radio site 10 during for instance the next coming hour. Thus, an ML component of the RBS 11 may make use of historical data patterns to determine future radio site power consumption. For instance, the RBS 11 may conclude, by analysing the historical data, that the power consumption on Tuesdays between 10:00 and 11:00 is more or less always the same.

Figure 3A:
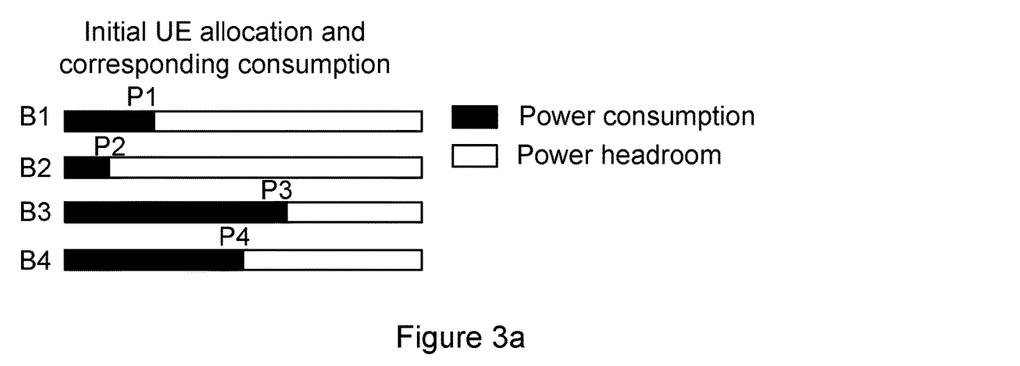
FIGS. 3a-c illustrate estimated power consumption and reallocation of mobile devices based on the estimation.

FIG. 3a illustrates the estimated RBS power consumption for each frequency band of the radio site 10. Hence, radio traffic of the UEs in first frequency band B1 is estimated to cause the RBS 11 have a power consumption P1, radio traffic in second frequency band B2 is estimated to cause a power consumption P2, radio traffic in third frequency band B3 is estimated to cause a power consumption P3, while radio traffic in fourth frequency band B4 is estimated to cause a power consumption P4.

In this exemplifying embodiment, it is further assumed that the frequency of the first band B1 is the highest, the second band B2 has the next-highest frequency, the third band B3 has the third-highest frequency, while the lowest-frequency carrier forms the fourth band B4.

As further can be seen in FIG. 3a, there is a maximum amount of power that the RBS 11 can deliver for each band. It is noted that this may differ from one band to another even though in the illustrated embodiments, the maximum amount of power is assumed to be the same for all bands. The remaining power capacity in each band that can be delivered before the maximal power level is reached is commonly referred to as power headroom. In practice, the full power headroom is rarely used in order to provide some power margin. Rather, a power threshold T (as shown in FIG. 3b) is set slightly under the maximum power level to avoid power amplifiers of the RBS 11 being operated at their maximal output power level.

Again with reference to the flowchart of FIG. 2, after the power consumption P1-P4 caused by the UEs 12-23 in each frequency band B1-B4 of the radio site 10 has been estimated in step S101, the RBS 11 determines in step S102 whether or not total power consumption of the radio site 10 can be decreased by reallocating one or more of the UEs from one frequency band to another while not exceeding a power headroom limit of the band to which the UE is reallocated.

Figure 3B:
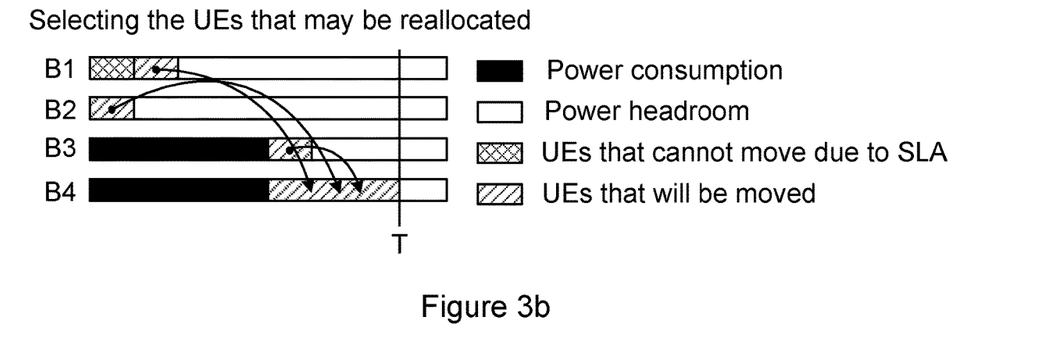

FIG. 3b illustrates reallocation of three UEs. In this particular example, it is assumed that first UE 12 and second UE 13 is allocated to the first frequency band B1, the third UE 13 is allocated to the second frequency band B2, fourth UE 15 through eighth UE 19 is allocated to the third frequency band B3, while the remaining four UEs 20-23 are allocated to the fourth frequency band B4.

Hence, the RBS 11 determines in step S102 that one UE of the first frequency band B1, e.g. the second UE 13, is reallocated to the fourth band B4; the single third UE 14 in the second band B2 is reallocated to the fourth band B4, and one of the UEs in the third band B3, e.g. the eighth UE 19, is reallocated to the fourth band B4.

Advantageously, since the second UE 13, the third UE 14 and the eighth UE 19 all are reallocated in step S103 from higher-frequency bands B1, B2 and B3 to lower-frequency band B4, the total power consumption of the radio site 10 will decrease as radio traffic communicated at higher frequencies consumes more RBS power for the same traffic load as compared to being communicated at a lower frequency.

In the example of FIG. 3b, an embodiment is described where service level as stipulated for instance by a Service Level Agreement (SLA) of the first UE 12 is taken into consideration. As can be seen in FIG. 3b, the first UE 12 which remain in the first frequency band B1 could either be moved to the second band B2 or the third band B3 (but not to the fourth band B4 since the power headroom threshold T is reached). However, it is in this example assumed that the Quality of Service (QoS) to which the first UE 12 has agreed cannot be delivered in either the second band B2 or the third band B3 (for frequency reasons it would indeed be unfavourable to reallocate the first UE 12 from the higher-frequency first band B1 to the lower-frequency second band B2).

Hence, the RBS 11 determines that the first UE 12 is to remain allocated to the first frequency band B1.

Figure 3C:
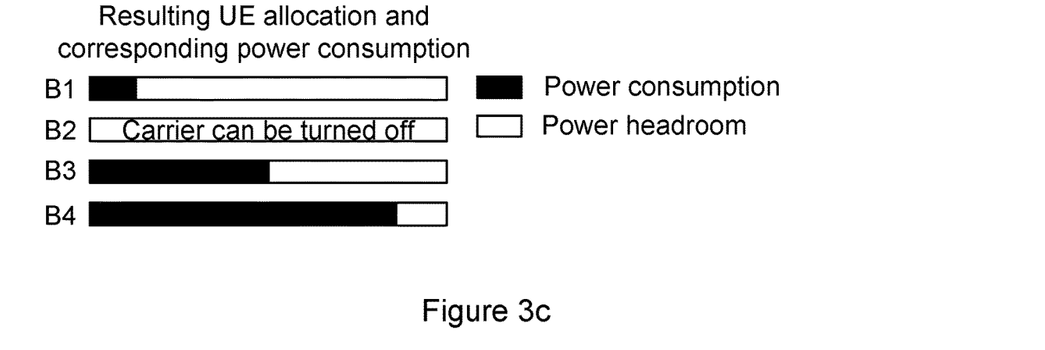

FIG. 3c shows the allocation of UEs to frequency bands after the reallocation of the three UEs 13, 14 and 19 to the fourth frequency band B4 has been performed by the RBS 10 in the radio site 10.

In addition to advantageously having reallocated the three UEs 13, 14 and 19 from higher-frequency bands B1, B2, B3 to lower-frequency bands B4—thereby decreasing the power consumption of the RBS 11—a further advantageous effect is attained.

As can be seen in FIG. 3c, no UEs are allocated to the second frequency band B2, which has as a result that the RBS power amplifier serving the second band B2—and thus transmitting the associated carrier signal—advantageously can be turned off. This will in itself further decrease the power consumption of the RBS 11, since any power amplifier in operation (i.e. transmitting a carrier signal) will consume power even if no UEs are allocated to the served frequency band.

Figure 4:
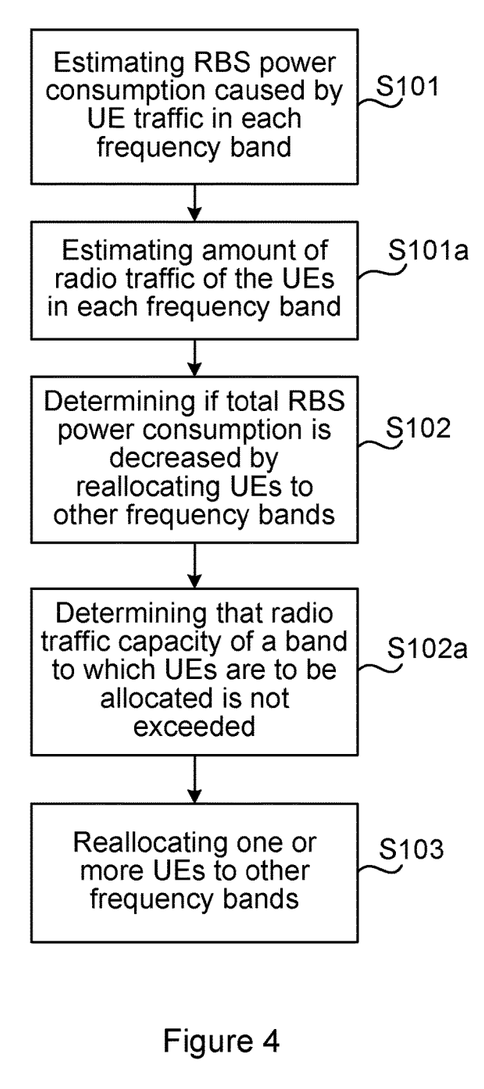
FIG. 4 shows a flowchart illustrating a method of controlling allocation of mobile devices to frequency bands in a radio site according to a further embodiment.

In a further embodiment, with reference to the flowchart of FIG. 4, the amount of radio traffic of the UEs 12-23 in each frequency band of the radio site 10 is taken into account upon reallocating any UEs.

Hence, in addition to step S101 previously described with reference to FIG. 2 of estimating RBS power consumption caused by the UEs 12-23, the method comprises step S101a of estimating amount of radio traffic of the UEs 12-23 in each frequency band of the radio site 10.

Thereafter, as previously described, the RBS 11 determines in step S102 whether or not total power consumption of the radio site 10 can be decreased by reallocating one or more of the UEs from one frequency band to another while not exceeding a power headroom limit of the band to which the UE is reallocated.

In this embodiment, the RBS 11 will further in step S102a determine whether or not amount of radio traffic of the one or more UEs 12-23 to be reallocated from one frequency band to another would result in a radio traffic capacity of the band to which the UE is to be reallocated is being exceeded. If not, reallocation is performed in step S103.

In a further embodiment, not only power consumption is taken into account, but also power efficiency.

In this particular exemplifying embodiment, as a measure of the power consumption that UE radio traffic is causing the RBS 11 in each band, the so-called Reference Signal Received Power (RSRP) will be used. The RSRP is measured at each UE 12-23 for a reference signal transmitted by the RBS 11 and reported back to the RBS 11.

In addition, radio usage of the UEs 12-23 in each band will be taken into account in order to attain an indication of the power efficiency of each carrier signal.

Figure 5:
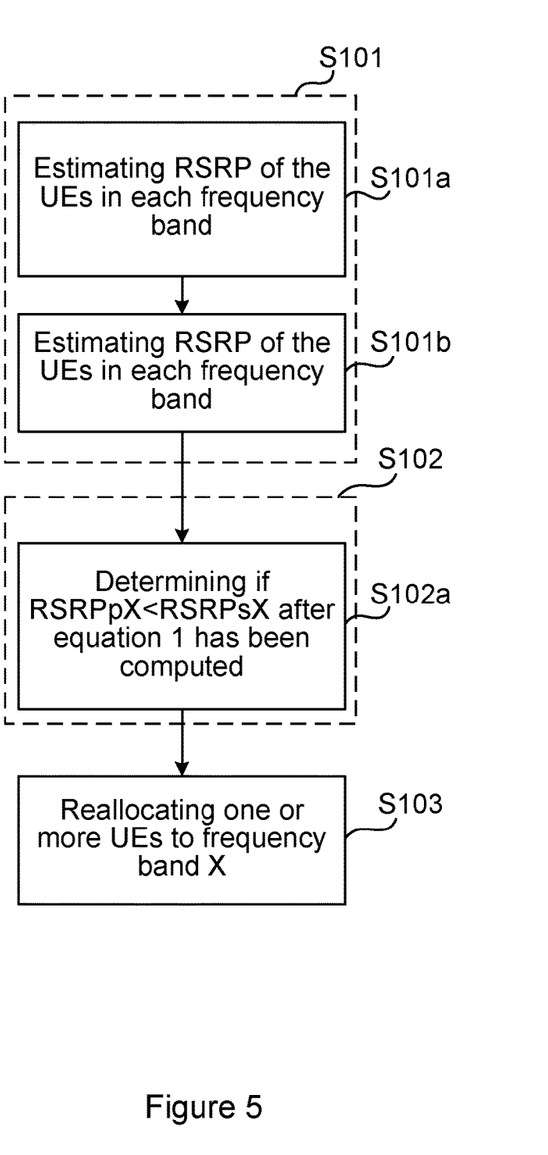
FIG. 5 shows a flowchart illustrating a method of controlling allocation of mobile devices to frequency bands in a radio site according to a further embodiment.
Figure 6A:
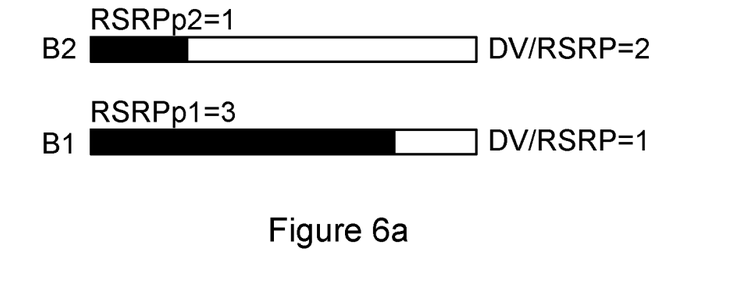
FIG. 6a illustrates two frequency bands and estimated parameters for the bands.

FIG. 5 shows a flowchart illustrating a method of controlling allocation of mobile devices to frequency bands in a radio site according to an embodiment where the power efficiency is taken into account. In this particular example, the RBS 11 is assumed to utilize two frequency bands B1 and B2, i.e. two carrier signals, to serve the twelve UEs 12-23, as illustrated in FIG. 6a.

In step S101a, the RBS 11 estimates the RSRP of each frequency band of the radio site 10. In step S101b, the RBS 11 estimates the radio usage (i.e. total amount or volume of radio traffic of the UEs) of each frequency band B1, B2 of the radio site 10. The estimated radio usage will in the following be referred to as DV ("data volume").

Thereafter, based on the estimated RSRP and the estimated DV, the power efficiency per carrier signal is computed as DV/RSRP. In the following, for the first frequency band B1 the computed ratio is referred to as a, while for the second frequency band B2 the computed ratio is referred to as b.

In the exemplifying embodiment of FIG. 5, the estimated RSRP of first band B1 (referred to as $RSRP_{p1}$) is 3, while the estimated RSRP of second band B2 (referred to as $RSRP_{p2}$) is 1.

Further, the estimated total amount of radio traffic DV of the UEs of each band is $DV_{p1}=3$ for the first band B1 and $DV_{p2}=2$ for the second band B2.

Thereafter, it is determined in step 102a whether or not power consumption of the RBS 11 is decreased by reallocating one or more of the UEs 12-23 from one frequency band to another, while not exceeding a power headroom limit of the frequency band to which the reallocation is performed.

In this exemplifying embodiment, this is performed by solving:

$$a*RSRP_p1+b*RSRP_p2=a*RSRP_s1+b*RSRP_s2 \qquad \text{equation 1}$$

where $RSRP_{s1}$ and $RSRP_{s2}$ denotes the RSRP of each frequency band B1, B2 after a hypothetical reallocation of any UE(s) has been performed. That is, $RSRP_{s1}$ and $RSRP_{s2}$ denotes the RSRP of each frequency band B1, B2 for an estimated computed reallocation of UEs. As will be shown in the following; if this hypothetical reallocation indicates that the power consumption of the RBS 11 decreases, then the UEs indeed will be reallocated in accordance with this hypothetical reallocation.

In this exemplifying embodiment:

$$a = \frac{DVp1}{RSRP_p1} = \frac{3}{3} = 1, b = \frac{DVp2}{RSRP_p2} = \frac{2}{1} = 2$$

Hence, equation 1 is solved using the exemplifying numerals discussed hereinabove:

1*3+2*1=1*1+2*2

That is, $RSRP_{s1}=1$ and $RSRP_{s2}=2$.
This result is interpreted as:
if $RSRP_pX > RSRP_sX$, then remove UE(s) from frequency band X, and
if $RSRP_pX < RSRP_sX$, then add UE(s) to frequency band X.

In this particular exemplifying embodiment:
$RSRP_{p1} > RSRP_{s1}$, i.e. remove UE(s) from the first frequency band B1, and
$RSRP_{p2} < RSRP_{s2}$, i.e. add UE(s) to the second frequency band B2.

In other words, in step S102a, the RBS 11 computes a sum of a ratio between the estimated amount of radio traffic DV and the estimated RSRP over all frequency bands B1, B2 of the radio site 10, The computed sum is set to equal a sum of a ratio between the amount of radio traffic and the RSRP over all frequency bands of the radio site 10 after a hypothetical reallocation has been performed with the same assumed amount of radio traffic, as set out in equation 1.

In step S102a, the power consumption of the RBS 11 is decreased if the RSRP for a particular frequency band after the hypothetical reallocation has been performed is higher than the estimated RSRP for the particular frequency band, i.e. if $RSRP_pX < RSRP_sX$.

Figure 6B:
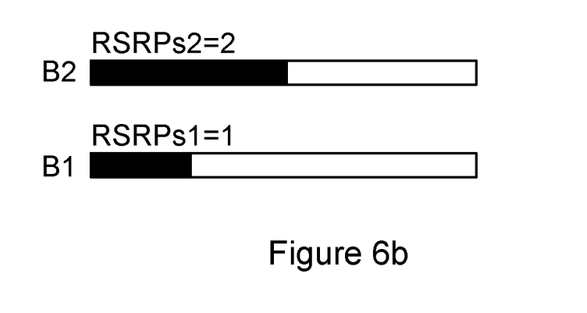
FIG. 6b illustrates the two frequency bands and the parameters for the bands after reallocation.

To conclude, UEs will in this particular example be reallocated from the second frequency band B2 to the first frequency band B1, as illustrated in FIG. 6b thereby decreasing power consumption of the RBS 11, as can be seen by the total RSRP decreasing. In an embodiment, as many UEs as possible are reallocated from the second frequency band B2 to the first frequency band B1 while not exceeding a power headroom limit of the first frequency band B1, possibly by applying the previously discussed power headroom threshold T to provide some power margin in the band.

Further, in an embodiment, one frequency band is always maintained by the RBS 11 at the radio site 10 such that coverage is always provided. In other words, the RBS 11 will always transmit at least one carrier signal at the radio site 10.

Figure 7:
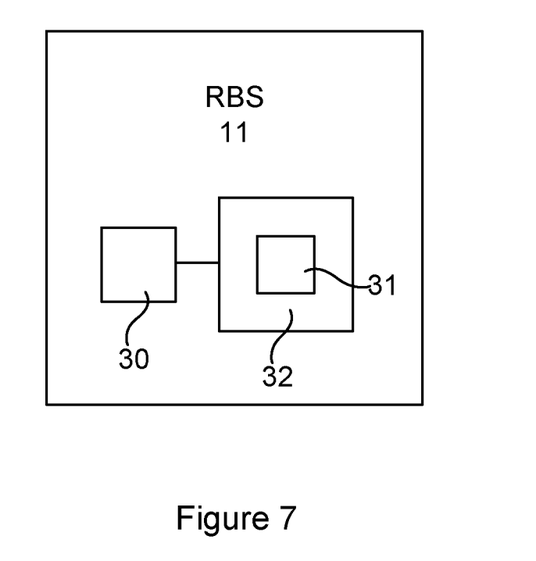
FIG. 7 shows a radio base station according to an embodiment.

FIG. 7 illustrates an RBS 11 according to an embodiment. The steps of the method performed by the RBS 11 of controlling allocation of mobile devices to frequency bands in a radio site are in practice performed by a processing unit 30 embodied in the form of one or more microprocessors arranged to execute a computer program 31 downloaded to a suitable storage volatile medium 32 associated with the microprocessor, such as a Random Access Memory (RAM), or a non-volatile storage medium such as a Flash memory or a hard disk drive. The processing unit 30 is arranged to cause the RBS 11 to carry out the method according to embodiments when the appropriate computer program 31 comprising computer-executable instructions is downloaded to the storage medium 32 and executed by the processing unit 30. The storage medium 32 may also be a computer program product comprising the computer program 31. Alternatively, the computer program 31 may be transferred to the storage medium 32 by means of a suitable computer program product, such as a Digital Versatile Disc (DVD) or a memory stick. As a further alternative, the computer program 31 may be downloaded to the storage medium 32 over a network. The processing unit 30 may alternatively be embodied in the form of a digital signal processor (DSP), an application specific integrated circuit (ASIC), a field-programmable gate array (FPGA), a complex programmable logic device (CPLD), etc.

It is noted that even though it has been described hereinabove that the steps of the method of controlling allocation of mobile devices 12-23 to frequency bands in a radio site 10 is performed by the RBS 11, if may be envisaged that step S101 of power consumption of the RBS 11 caused by radio traffic of the UEs 12-23 in each frequency band of the radio site 10, as well as step S102 of determining whether or not power consumption of the RBS 11 is decreased by reallocating at least one of the UEs 12-23 from one frequency band to another frequency band, while not exceeding a power headroom limit of said another frequency band, are performed remote from the RBS 11 such as in a cloud server (not shown) or any other appropriate device. Further, a decision to reallocate one or more UEs from one frequency band to another may be taken by the cloud server, even though the RBS 11 will be the device sending the reallocation instruction to the UE.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method, implemented by a radio base station, of controlling allocation of mobile devices to frequency bands in a radio site, the method comprising:
   estimating power consumption of the radio base station caused by radio traffic of the mobile devices in each frequency band of the radio site;
   determining whether or not power consumption of the radio base station is decreased by reallocating at least one of the mobile devices from one frequency band to another frequency band, while not exceeding a power headroom limit of said another frequency band; and if so
   reallocating said at least one mobile device from said one frequency band to said another frequency band.

2. The method of claim 1, further comprising:
   estimating amount of radio traffic of the mobile devices in each frequency band of the radio site; and
   determining whether or not amount of radio traffic of said at least one of the mobile devices to be reallocated from said one frequency band to said another frequency band would result in a radio traffic capacity of said another band being exceeded, wherein the step of reallocating only is performed if radio traffic capacity of said another band is not being exceeded.

3. The method of claim 1, wherein the estimating of power consumption of the radio base station caused by radio traffic of the mobile devices in each frequency band of the radio site comprises:

estimating Reference Signal Received Power (RSRP) of the mobile devices in each frequency band of the radio site; and estimating amount of radio traffic of the mobile devices in each frequency band of the radio site; and the determining whether or not power consumption of the radio base station is decreased by reallocating at least one of the mobile devices comprises:

computing a sum of a ratio between the estimated amount of radio traffic and the estimated RSRP over all frequency bands of the radio site, the computed sum being set to equal a sum of a ratio between the amount of radio traffic and the RSRP over all frequency bands of the radio site after a hypothetical reallocation being performed with the same assumed amount of radio traffic, wherein the power consumption of the radio base station is decreased if the RSRP for a particular frequency band after said hypothetical reallocation being performed is higher than the estimated RSRP for the particular frequency band.

4. The method of claim 3, wherein said at least one of the mobile devices is reallocated from a frequency band for which the RSRP after said hypothetical reallocation being performed is lower than the estimated RSRP for the frequency band.

5. The method of claim 1, wherein the power headroom limit is set to a threshold power value below a maximum power level of said another frequency band.

6. The method of claim 1, the steps of the method being performed using a machine learning (ML) model.

7. The method of claim 1, further comprising:
transmitting at least one carrier signal at the radio site to provide coverage.

8. A non-transitory computer-readable medium comprising, stored thereupon, a computer program comprising computer-executable instructions for causing a device to perform steps recited in claim 1 when the computer-executable instructions are executed on a processing unit included in the device.

9. A method, implemented by a radio base station, of controlling allocation of mobile devices to frequency bands in a radio site, comprising:
estimating power consumption of the radio base station caused by radio traffic of the mobile devices in each frequency band of the radio site by analyzing historical power consumption data of the radio site utilizing machine learning;
determining whether or not power consumption of the radio base station is decreased by reallocating at least one of the mobile devices from one frequency band to another frequency band, while not exceeding a power headroom limit of said another frequency band; and if so
reallocating said at least one mobile device from said one frequency band to said another frequency band.

10. A radio base station configured to control allocation of mobile devices to frequency bands in a radio site, the radio base station comprising a processing unit and a memory, said memory containing instructions executable by said processing unit, whereby the radio base station is operative to:

estimate power consumption of the radio base station caused by radio traffic of the mobile devices in each frequency band of the radio site;
determine whether or not power consumption of the radio base station is decreased by reallocating at least one of the mobile devices from one frequency band to another frequency band, while not exceeding a power headroom limit of said another frequency band; and if so
reallocate said at least one mobile device from said one frequency band to said another frequency band.

11. The radio base station of claim 10, further being operative to:
estimate amount of radio traffic of the mobile devices in each frequency band of the radio site; and
determine whether or not amount of radio traffic of said at least one of the mobile devices to be reallocated from said one frequency band to said another frequency band would result in a radio traffic capacity of said another band being exceeded, wherein the step of reallocating only is performed if radio traffic capacity of said another band is not being exceeded.

12. The radio base station of claim 10, further being operative to, when estimating power consumption of the radio base station caused by radio traffic of the mobile devices in each frequency band of the radio site:
estimate Reference Signal Received Power (RSRP) of the mobile devices in each frequency band of the radio site; and
estimate amount of radio traffic of the mobile devices in each frequency band of the radio site; and the determining whether or not power consumption of the radio base station is decreased by reallocating at least one of the mobile devices comprises:
computing a sum of a ratio between the estimated amount of radio traffic and the estimated RSRP over all frequency bands of the radio site, the computed sum being set to equal a sum of a ratio between the amount of radio traffic and the RSRP over all frequency bands of the radio site after a hypothetical reallocation being performed with the same assumed amount of radio traffic, wherein the power consumption of the radio base station is decreased if the RSRP for a particular frequency band after said hypothetical reallocation being performed is higher than the estimated RSRP for the particular frequency band.

13. The radio base station of claim 12, wherein said at least one of the mobile devices is reallocated from a frequency band for which the RSRP after said hypothetical reallocation being performed is lower than the estimated RSRP for the frequency band.

14. The radio base station of claim 10, wherein the power headroom limit is set to a threshold power value below a maximum power level of said another frequency band.

15. The radio base station of claim 10, the radio base station being operative to perform actions by executing a machine learning (ML) model.

16. The radio base station of claim 10, further being operative to:
transmit at least one carrier signal at the radio site to provide coverage.

* * * * *